(12) United States Patent
Katagishi et al.

(10) Patent No.: US 6,408,193 B1
(45) Date of Patent: Jun. 18, 2002

(54) CELLULAR TELEPHONE

(75) Inventors: Makoto Katagishi, Chigasaki; Shirou Machida, Yokohama, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/436,502

(22) Filed: Nov. 9, 1999

(30) Foreign Application Priority Data

Nov. 10, 1998 (JP) .......................................... 10-318689

(51) Int. Cl.⁷ ................................................. H04Q 7/32
(52) U.S. Cl. ...................... 455/571; 455/574; 455/126; 455/127; 455/115; 375/345; 370/311; 370/342
(58) Field of Search ................................ 455/571, 126, 455/127, 115, 116, 118, 121, 125, 73, 232.1, 132.4, 239.1, 240.1, 250.1, 251.1, 245.1, 574; 330/278, 285, 129, 2; 375/345; 370/311, 342

(56) References Cited

U.S. PATENT DOCUMENTS

| | | | |
|---|---|---|---|
| 5,056,109 A | | 10/1991 | Gilhousen et al. .......... 455/127 |
| 5,128,629 A | * | 7/1992 | Trinh ......................... 455/127 |
| 5,129,098 A | * | 7/1992 | McGirr et al. .............. 455/127 |
| 5,732,334 A | * | 3/1998 | Miyake ....................... 455/127 |
| 5,737,697 A | * | 4/1998 | Yamada ....................... 455/127 |
| 6,175,270 B1 | * | 1/2001 | Vannucci ..................... 455/126 |

FOREIGN PATENT DOCUMENTS

| | | |
|---|---|---|
| JP | 4-277909 | 10/1992 |
| JP | 6-252797 | 9/1994 |
| JP | 9-46152 | 2/1997 |

* cited by examiner

*Primary Examiner*—William Trost
*Assistant Examiner*—Keith Ferguson
(74) *Attorney, Agent, or Firm*—Mattingly, Stanger & Malur, P.C.

(57) ABSTRACT

A cellular telephone receives a first communication signal from a cell-site station and transmits a second communication signal to the cell-site station. The cellular telephone includes an antenna, a duplexer, a receiver, an encoder/decoder apparatus, an acoustic transducer, a transmitter and a controller. The receiver is connected to the antenna through the duplexer. The receiver converts the first communication signal into a voice signal code, and outputs a signal indicating an intensity of the first communication signal. The transmitter is connected to the encoder/decoder apparatus and to the antenna through the duplexer. The receiver converts the input voice code signal from the encoder/decoder apparatus into the second communication signal. The controller is connected to the receiver and the transmitter. The controller controls amplitude of the transmitter corresponding to said intensity of the first communication signal. The transmitter includes a variable amplitude amplifier and a power amplifier means, and the controller includes a central processing unit and a memory. The controller controls a gain of the variable amplitude amplifier and a bias condition of the power amplifier means according to a function stored in the memory.

7 Claims, 8 Drawing Sheets

CELLULAR TELEPHONE

BACKGROUND OF THE INVENTION

1. Technical Field of the Invention

The present invention generally relates to a cellular telephone, and more specifically, relates to a cellular telephone used in Code Division Multiple Access (CDMA) system.

2. Description of Related Art

An example of a CDMA cellular telephone system is disclosed in U.S. Pat. No. 5,056,109. In this example, a cellular telephone has transmit power control circuitries 76 and 80 connected in series between a transmit modulator 84 and an antenna 70 and controlled by a control processor 78, so as to control and adjust a power level of transmission power. The control and the adjustment of the power level are required so as to overcome deleterious terrestrial channel fading between a terrestrial base station (a cell-site station) and a mobile unit. The terrestrial channel fading is caused by a path loss in the terrestrial channel, which is on the order of over 80 dB, and the power adjustment at the mobile unit is implemented by a predetermined amount, nominally 1 dB.

Figure 11:
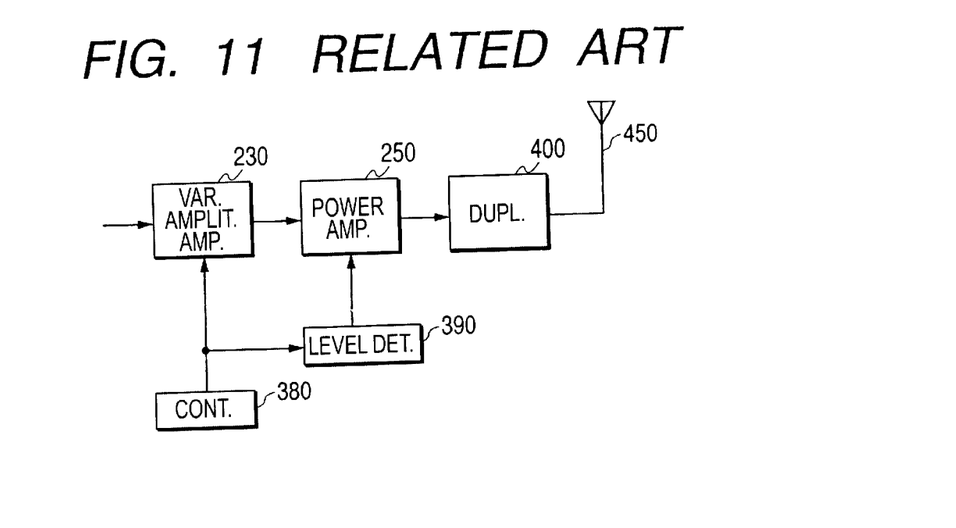
FIG. 11 shows a block diagram of a main part of the cellular telephone in the related art.
Figure 12:
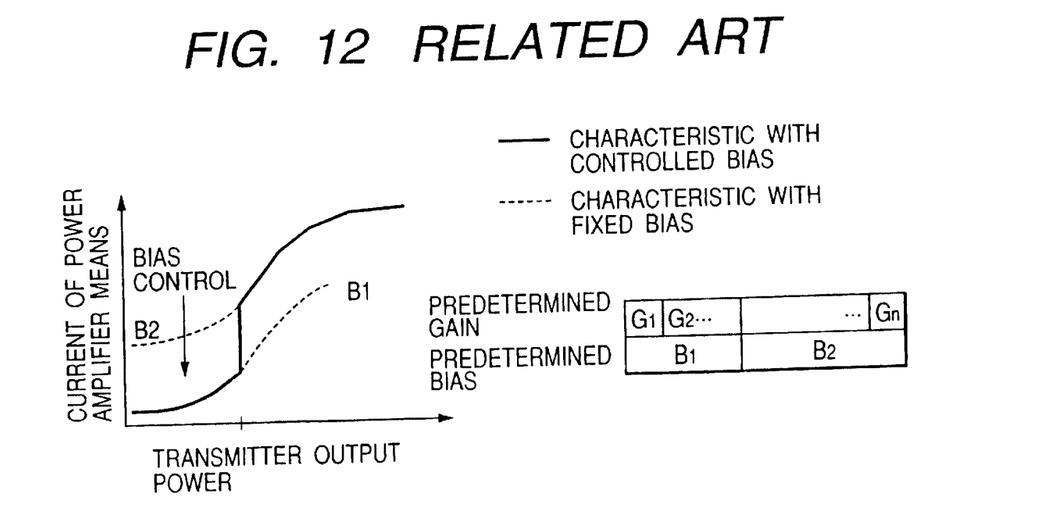
FIG. 12 shows a characteristic curve in the related art.

The typical standard for the CDMA cellular telephone system enacted in the U.S. is TIA IS-95 (hereinafter IS-95). An example of a transmitter applying IS-95 is shown in FIG. 11. In this example, a modulated signal converted into a transmitting frequency band is supplied to a variable amplitude amplifier 230 and the output of the variable amplitude amplifier 230 is further amplified by a power amplifier means 250 and transmitted to an antenna 450 through a duplexer 400. A controller 380 supplies a gain control signal to the variable amplitude amplifier 230 in order to adjust the gain such that the power transmitted from the antenna 450 will satisfy the required value of transmitting power. The gain control signal is also supplied to a level detecting means 390. The level detecting means 390 supplies a bias signal to the power amplifier means 250 for adjusting the transmitting power. The level detecting means 390 detects a level of the gain control signal, and as shown in FIG. 12, when the level is high (e.g. Gn), it outputs bias value of B2. Then the level decreases, and the level crosses a threshold value, the level detecting means 390 changes the bias abruptly from B2 to B1. Current of the power amplifier means change abruptly when the gain level crosses the threshold value. In IS-95, open-loop power control and closed-loop power control are employed in order to regulate a receiving power at the cell-site station. The open-loop power control, which definitely determines a transmitting power according to an information indicating an intensity of electric field detected by a receiver, does not require a severe accuracy (generally within the range of 9.5 dB). On the other hand, the closed-loop power control performs fine control according to an information indicating a variation of a gain of the signal transmitted from the cell-site station (generally 1 dB step). In this case, the transmitter performs the open-loop power control at first, then it performs the closed-loop power control for the transmitted power to converge into a desired value which the cell-site station requires.

Japanese Patent Laid-open No. Hei-9-46152 discloses a mobile unit including a receiver and a transmitter, where the transmitter has a variable amplitude amplifier for adjusting the power level of the transmission power. In this related art, the mobile unit includes a high frequency power amplifier having a field effect transistor (FET) as an amplifying element, and the variable amplitude amplifier is composed so as to control a bias condition of the FET according to a transmission power. Amount of attenuation according to the transmission power, and gate voltage of the FET corresponding to the amount of attenuation are controlled by degrees, i.e. by 4 dB, according to the predetermined values. When the transmission power is low, the gate voltage is reduced so as to reduce current consumption for prolonging battery life.

A problem in the related art is that the large current consumption shortens the battery life, which shortens the hours of communication on the phone.

Another problem in the related art is that the compensation of the battery life requires an increase of volume and weight of the battery. Further related art is also disclosed in Japanese Patent Application Laid-open Nos. Hei-04-277909 and Hei-06-252797.

SUMMARY OF THE INVENTION

It is therefore an object of the present invention to solve the problems of the related art explained above. In view. of the objective of solving the problems explained above, the cellular telephone of the present invention includes an antenna for receiving a first communication signal from a cell-site station and transmitting a second communication signal to the cell-site station, a duplexer connected to the antenna, a receiver connected to the antenna through the duplexer for converting the first communication signal into a voice signal code, and for outputting a signal indicating an intensity of the first communication signal, an encoder/decoder apparatus connected to the receiver and an acoustic transducer for converting the voice signal code into audio signal for driving the acoustic transducer and converting an audio input signal from the acoustic transducer into a input voice code signal, a transmitter connected to the encoder/decoder apparatus and to the antenna through the duplexer for converting the input voice code signal into the second communication signal, and a controller connected to the receiver and the transmitter for controlling amplitude of the transmitter corresponding to the intensity of the first communication signal, wherein the transmitter includes a variable amplitude amplifier and a power amplifier, the controller includes a central processing unit and a memory, the controller controls a gain of the variable amplitude amplifier and a bias condition of the power amplifier according to a function stored in the memory.

In another embodiment, the controller further includes a pulse generator. The pulse generator is connected to the power amplifier so as to supply a pulse as a bias control signal, and the controller controls a pulse width of the pulse so as to control the bias condition.

In a third embodiment, the controller further includes a pulse generator. The pulse generator is connected to the power amplifier so as to supply pulses as a bias control signal, and the controller controls a pulse density of the pulses so as to control the bias condition.

In a fourth embodiment, the power amplifier further includes a smoothing circuit for smoothing the pulse.

In a fifth embodiment, the transmitter further includes a signal generator connected to the controller. The signal generator is connected to the variable amplitude amplifier and the power amplifier so as to supply a gain control signal and a bias control signal to the variable amplitude amplifier and the power amplifier respectively.

The cellular telephone of the present invention also includes an antenna for receiving a first communication signal from a cell-site station and transmitting a second communication signal to the cell-site station, a duplexer connected to the antenna, a receiver connected to the antenna through the duplexer for converting the first communication signal into a voice signal code, and for outputting a signal indicating an intensity of the first communication signal, an encoder/decoder apparatus connected to the receiver and an acoustic transducer for converting the voice signal code into audio signal for driving the acoustic transducer and converting an audio input signal from the acoustic transducer into a input voice code signal, a transmitter connected to the encoder/decoder apparatus and to the antenna through the duplexer for converting the input voice code signal into the second communication signal, and a controller connected to the receiver and the transmitter for controlling amplitude of the transmitter corresponding to the intensity of the first communication signal, wherein the transmitter includes a variable amplitude amplifier and a power amplifier, the power amplifier includes a maximum power detector, the controller includes a central processing unit and a memory, the controller controls a gain of the variable amplitude amplifier according to a function stored in the memory, and the maximum power detector controls an output power of the power amplifier.

As explained above, since the controller controls a gain of the variable amplitude amplifier according to a function stored in the memory, a cellular telephone capable of reducing current consumption is available. In addition, small current consumption enables prolongation of battery life, or use of small-size battery, by which a cellular phone having a long service life or that having a small size is available.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure hereof this invention. While the foregoing and following written and illustrated disclosure focuses on disclosing exemplary embodiments of the invention, it should be clearly understood that the same is by way of illustration and example only and is not to be taken by way of limitation, the spirit and the scope of the present invention being limited only by the terms of the appended claims.

The following represents brief descriptions of the drawings, wherein:

FIG. 6 shows an example of the controller and the smoothing circuit in the second embodiment of the present invention.

FIG. 10 shows a characteristic curve in one embodiment of the present invention.

DETAILED DESCRIPTION OF THE INVENTION

Before beginning a detailed description of the subject invention, mention of the following is in order. When appropriate, like reference numerals and characters are used to designate identical, corresponding or similar components in differing figure drawings.

Exemplary embodiments of the present invention will now be explained with reference to FIGS. 1 to 10.

The first embodiment of the present invention is explained referring to FIGS. 1, 2, 3, 4 and 10. As disclosed in FIG. 1, a cellular telephone in this embodiment includes a receiver 100, a transmitter 200, a controller 300, an encoder/decoder apparatus 500, a duplexer 400 and an antenna 450. The antenna 450 is connected to the duplexer 400 so as to transmit or receive communication signals. The duplexer 400 is connected to the receiver 100 and transmitter 200 for transferring received signals from the antenna 450 to the receiver 100 and for suppressing signal levels outside of the receiving band. The duplexer 400 is also connected to the transmitter 200 for transferring signals from the transmitter 200 to the antenna 450.

Figure 1:
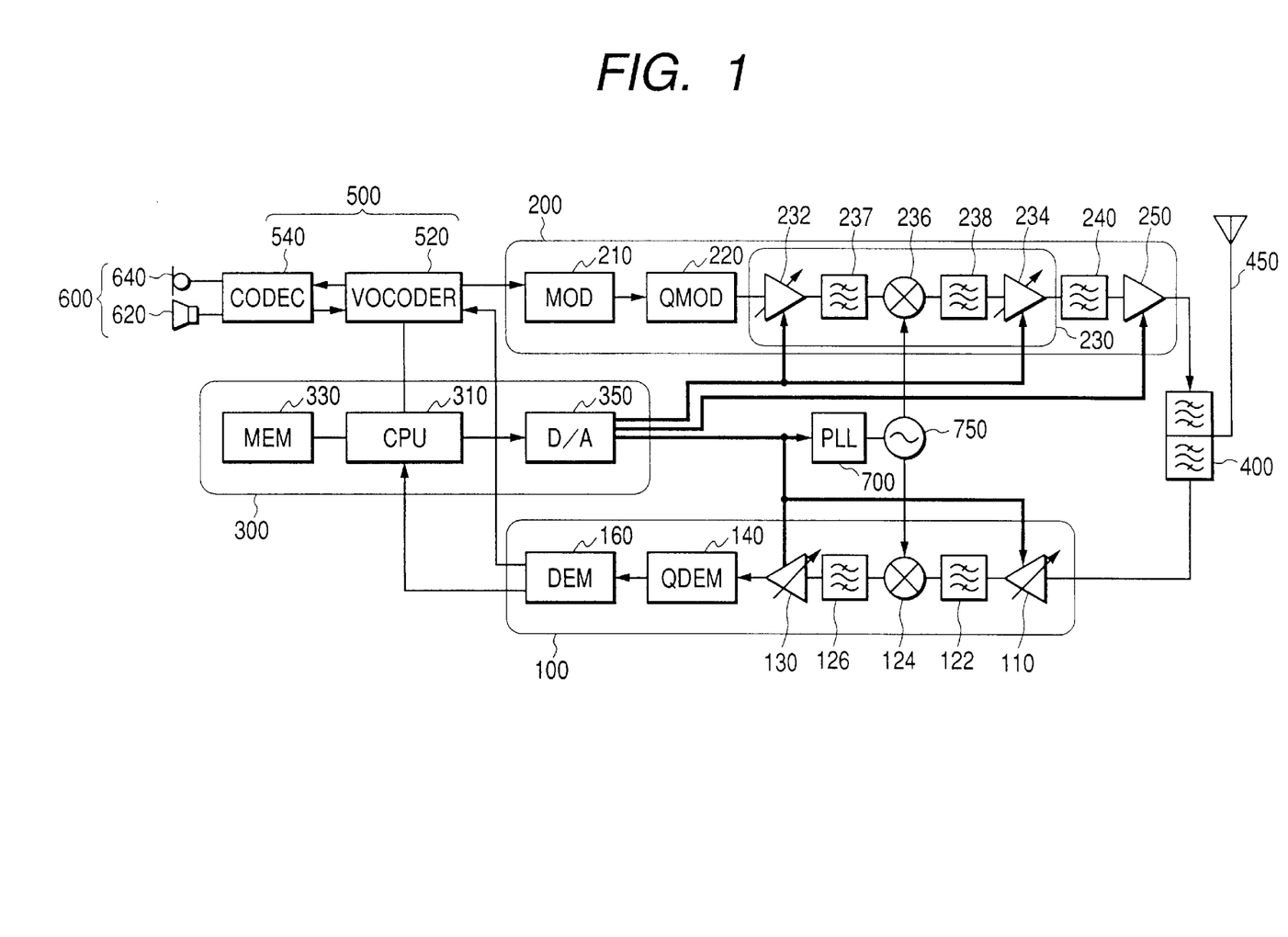
FIG. 1 shows a block diagram of a cellular telephone in the first embodiment of the present invention.

The receiver 100 includes input amplifiers 110, filters 122 and 126, a down-converter 124, an amplifier 130, a quadrature demodulator (QDEM) 140, and a base band demodulator (DEM) 160. In the receiver 100, the signal from the duplexer 400 is amplified by the input amplifiers 110, and its frequency is lowered down by the down-converter 124. The filters 122 and 126 are band-pass filters such as Surface Acoustic Wave (SAW) filters. Then the signal is amplified by the amplifier 130 and demodulated at the QDEM 140 by a modulation signal having a phase difference of 90 degrees. The demodulated signal is supplied to the DEM 160 and converted into a voice signal code. The DEM 160 outputs not only the voice signal code but also a signal indicating intensity of electric field of the received signals (hereinafter field intensity signal). The DEM 160 has a function of adjusting its input level, which enables to detect the intensity of electric field of the received signals by watching how much adjustment was made to obtain the desired signal level.

The voice code signal is supplied to the encoder/decoder apparatus 500. The encoder/decoder apparatus 500 includes a vocoder 520 and a codec 540. The codec 540 is connected to acoustic transducer 600. The acoustic transducer 600 transduces sound or voice into electric signals or vice versa. The acoustic transducer 600 includes a speaker 620 and a microphone 640. The voice code signal is first supplied to a vocoder 520, where it is converted into a digital signal. An output of the vocoder 520 is supplied to the codec 540, where it is converted into an audio signal. This audio signal is supplied to a speaker 620 so that a user of the cellular phone can hear the sound or voice transmitted from the cell-site station. The codec 540 is also connected to a microphone 640. The microphone 640 picks up sound or voice and convert them into an audio input signal. This audio input signal is input into the codec 540, where it is converted into a digital audio signal. The digital audio signal is supplied to the vocoder 520 and coded into an input voice code signal. The input voice code signal is supplied to the transmitter 200.

The transmitter 200 includes a base band modulator (MOD) 210, a quadrature modulator (QMOD) 220, variable amplitude amplifier 230, a filter 240, a power amplifier means 250. The variable amplitude amplifier 230 includes a first-stage amplifier 232, filters 237 and 238, an up-converter 236, a second-stage amplifier 234. The filters 237, 238 and 240 are band-pass filters such as SAW filters which are disposed for suppressing unnecessary waves for communication. In the transmitter, the input voice code signal is supplied to the MOD 210, where it is modulated into a signal suitable for wireless transmission. An output signal of the MOD 210 is supplied to QMOD 220, where it is modulated by a modulation signal having a phase difference of 90 degrees. An output signal of the QMOD 220, i.e., a modulated signal is supplied to the variable amplitude amplifier 230. In the variable amplitude amplifier 230, the modulated signal is supplied to the first-stage amplifier 232 and amplified to a suitable level. An output of the first-stage amplifier, or the amplified modulated signal is supplied to the up-converter 236 through the filter 237. A frequency of the amplified modulated signal is raised up at the up-converter 236 to a suitable value or range for wireless communication. An output of the up-converter 236 is supplied to the second-stage amplifier 234 through the filter 238, where it is amplified to a suitable level at radio frequency. An output of the second-stage amplifier 234, namely the output of the variable amplitude amplifier 230 is supplied to the power amplifier means or power amplifier 250 through the filter 240, where the power is amplified to a desired transmitting power. An output of the power amplifier means 250 is supplied to the antenna 450 through the duplexer 400.

The controller 300 is provided so as to control the power transmitted from the antenna 450. The controller 300 in this embodiment comprises a central processing unit (CPU) 310, a memory (MEM) 330 and a digital-analog converter (D/A) 350. The CPU 310 is connected to the DEM 160 of the receiver 100, and the field intensity signal is supplied to the CPU 310 from the receiver 100. The CPU 310 generates signals for controlling the variable amplitude amplifier 230, the power amplifier means 250, the amplifiers 110 and 130 in the receiver 100 and a phase-locked loop (PLL) 700. These signals are generated in such a manner that the CPU 310 processes data supplied from the receiver 100 and outputs the result through the D/A 350, or that the CPU 310 reads data stored in the MEM 330 and outputs them through the D/A 350, or that the CPU 310 processes the data stored in the MEM 330 and outputs the result through the D/A 350.

The PLL 700 controls an oscillator 750 so as to oscillate required frequency for communication according to the output signal of the CPU 310.

Figure 2:
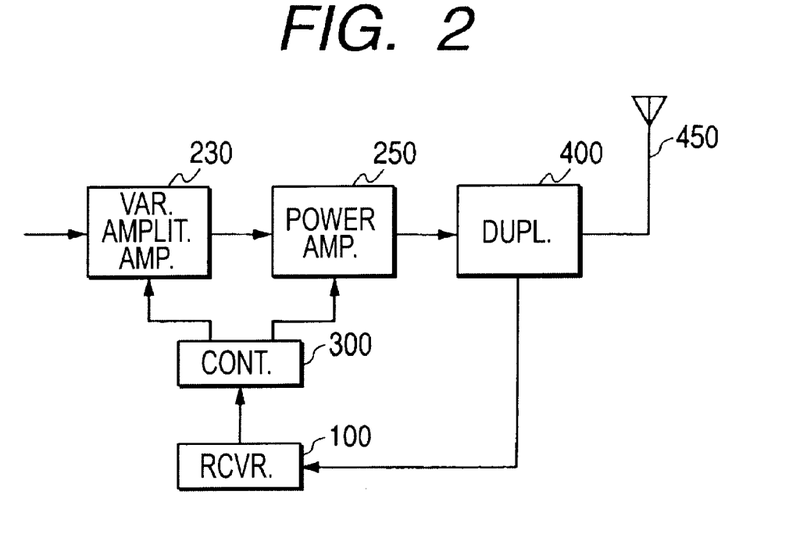
FIG. 2 shows a block diagram of a main part of the cellular telephone in the first embodiment of the present invention.
Figure 4:
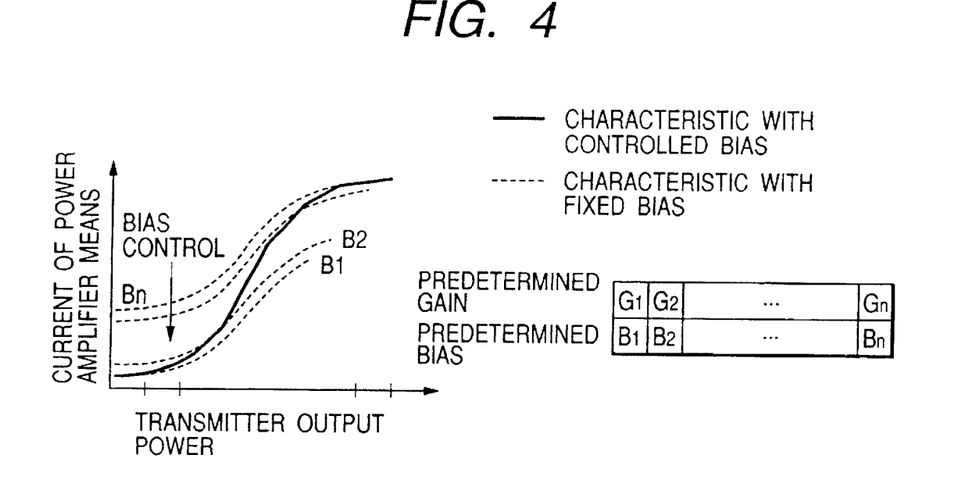
FIG. 4 shows a characteristic curve of a power amplifier means in the first embodiment of the present invention.

Details of the first embodiment is described hereinbelow. FIGS. 2 shows a block diagram of a main part of the cellular telephone in this embodiment. The controller 300 controls a gain of the variable amplitude amplifier 230 in such a manner that the transmitter 200 can provide a required transmitting power to the antenna 450. In this embodiment, the gain is determined so as to vary according to the transmitting power as shown in FIG. 4. Predetermined values of the gain (n pieces of values: G1, G2, ... Gn, where "n" is an integer greater than 2) are stored in the MEM 330 within the controller 300 as shown in FIG. 4. Gn is a gain which provides the maximum value of the required transmitting power, and G1 is a gain which provides the minimum value of the required transmitting power. Further, the controller 300 stores bias values (n pieces of values: B1, B2, ... Bn, where "n" is an integer greater than 2) for the power amplifier means 250 corresponding to each gain. When the bias is fixed to either one of the predetermined values, the characteristic of output power vs. current of power amplifier means varies as shown in the corresponding dotted line in FIG. 4. When the bias is fixed to Bn, it can satisfy the maximum value of the required transmitting power. However, the current of the power amplifier means is large at the minimum value of the required transmitting power. On the other hand, when the bias is fixed to B1, small current of the power amplifier means is available. However, the gain is too small to satisfy the maximum value of the required transmitting power. In this embodiment, a plurality of sets of the values of the gain and the bias are stored in the MEM 330, such that the value of the bias decreases corresponding to a decrease of the gain. The characteristic of output power vs. current of power amplifier means gradually decrease from that of Bn to that of B1 when the output power decreases as shown in the curved line in FIG. 4. This satisfies both the maximum value of the required transmitting power at the maximum output power and small current of the power amplifier means at the minimum output power. In order to realize the aforementioned gradually decreasing characteristics for reducing current consumption for the required transmitting power, bias conditions of the power amplifier means 250 are defined as a function of predetermined values of the gain for the variable amplitude amplifier 230. The function is also stored in MEM 330. The bias conditions for the n pieces of the gain values are calculated using the function and stored in MEM 330. The controller 300 controls the variable amplitude amplifier 230 and the power amplifier means 250 based on the conditions stored in MEM 330. In the actual designing, the bias conditions are selected within the region where the characteristics of power leakage into adjacent channels and et al are satisfied in addition to where the transmitting power are satisfied. Since the current of power amplifier means are lower than that of the fixed bias condition Bn, a range of transmitter output power where current consumption in the power amplifier means are reduced is much broader than that of the related art.

Figure 3:
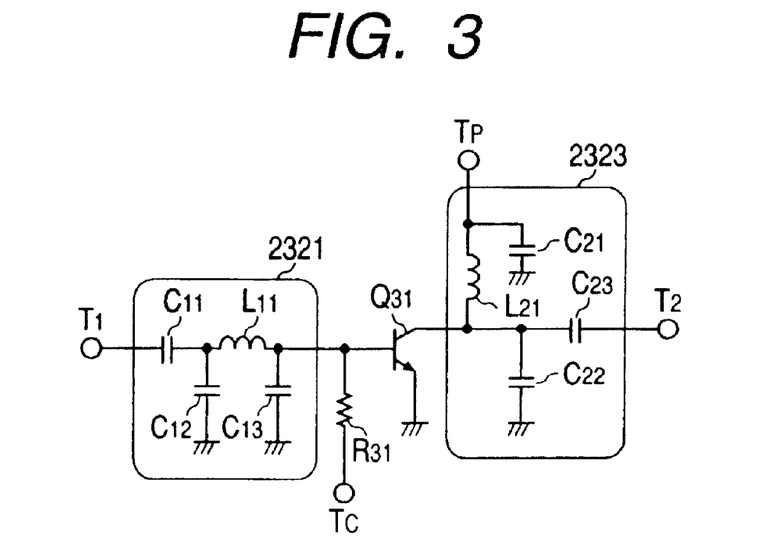
FIG. 3 shows an example of variable amplitude amplifier of the cellular telephone in the first embodiment of the present invention.

Details of the variable amplitude amplifier is shown in FIG. 3. In this embodiment, a transistor is employed as an amplifying element Q31. An input matching circuit 2321 is provided between an input terminal T1 and a base of the transistor Q31, and an output matching circuit 2323 is provided between a collector of the transistor Q31 and an output terminal T2 for obtaining the required gain. The input matching circuit 2321 includes capacitors C11, C12 and C13 and a coil L11. The capacitor C11 and the coil L11 are connected in series, and this series circuit of C11 and L11 is provided between the input terminal T1 and the base of the transistor Q31. One end of the capacitor C1 is connected to the input terminal T1, and the other end of the capacitor C11 is connected to the one end of the coil L11. The other end of the coil L11 is connected to the base of the transistor Q31. The capacitor C12 is provided between the other end of the capacitor C11 and the ground. The capacitor C13 is provided between the other end of the coil L11 and the ground. A control terminal Tc is connected to the base of the transistor Q31 through a resistor R31. The output matching circuit 2323 includes a coil L21 and capacitors C21, C22 and C23. The collector of the transistor Q31 is connected to the output terminal T2 through the capacitor C23. The collector of the transistor Q31 is also connected to a power source terminal Tp through the coil L21. The capacitor C21 is provided between the power source terminal Tp and the ground. The capacitor C22 is provided between the collector of the transistor Q31 and the ground. A power source voltage is supplied to the power source terminal Tp. The transistor Q31 controls the output power according to the control signal generated by the CPU 310. The higher the voltage of the control signal is, the more output power is obtained due to an increase of the collector current.

A variation of the first embodiment is explained below. In this variation, bias conditions of the power amplifier means 250 are directly defined as a function of output power of itself or as a function of predetermined value of the gain for the variable amplitude amplifier 230. The calculated values using the function is directly supplied to the power amplifier means 250 instead of n pieces of bias conditions stored in MEM 330. As an example of the function, the one that calculates the bias values by interpolating calculated results at predetermined gain values is employed. In this case, the controller 300 controls the variable amplitude amplifier 230 and the power amplifier means 250 according to the predetermined gain value for the variable amplitude amplifier 230 and the bias controlling signal for the power amplifier means calculated by the function stored in MEM 330. Since the bias is controlled according to the calculated values by the stored function, precise control of the bias is available, which enables to decrease the current consumed in the transmitter 200.

Figure 10A:
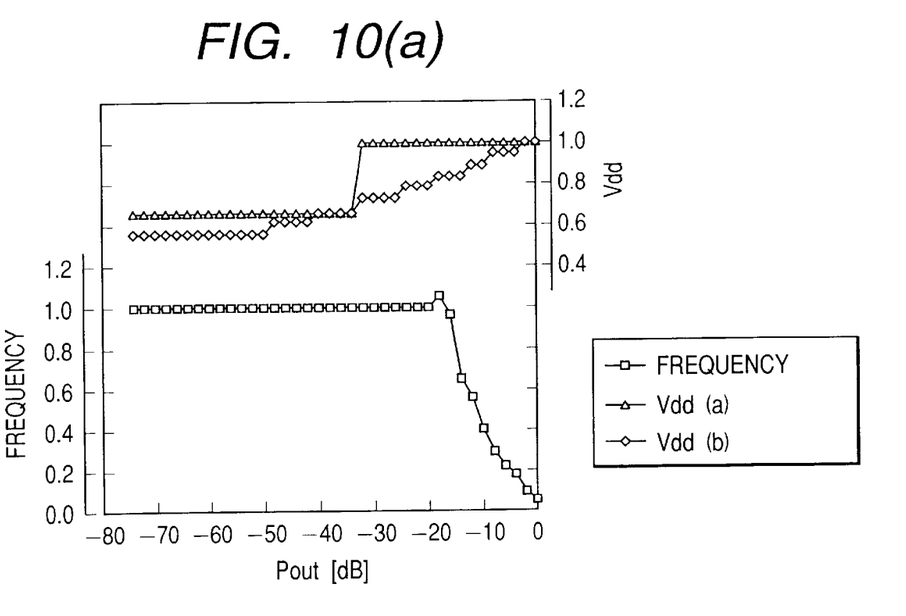
FIG. 10A shows a characteristic of output intensity vs. bias conditions comparing to that of the related art, and characteristic of output intensity vs. frequency or chance of occurring.
Figure 10B:
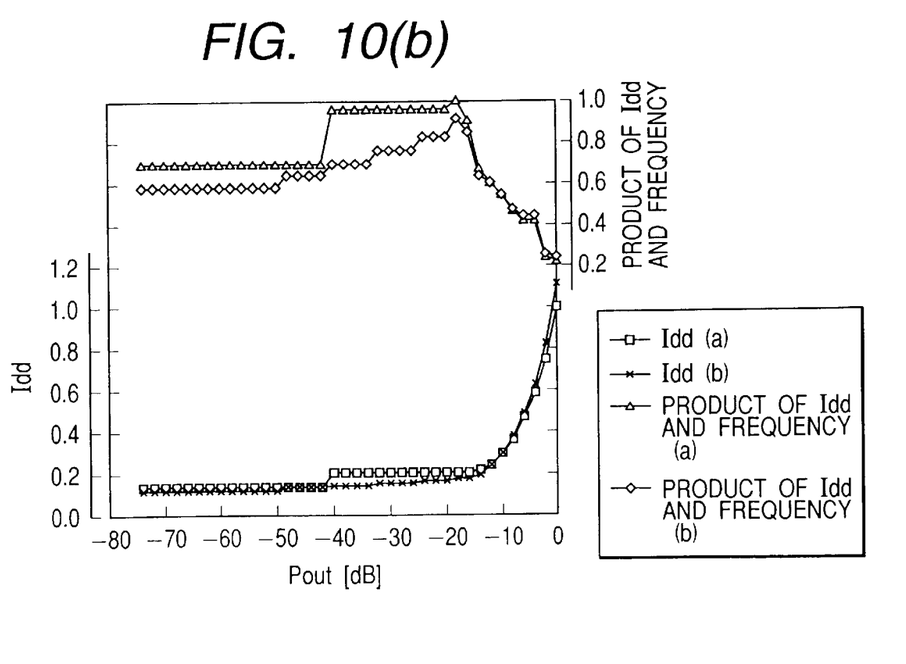
FIG. 10B shows a characteristic of output intensity vs. current consumption comparing to that of the related art, and a characteristic of output intensity vs. product of the current consumption and the frequency.

An example of the current decrease in this embodiment is explained using FIGS. 10A and 10B. FIG. 10A shows a characteristic of output intensity vs. bias conditions comparing to that of the related art, and characteristic of output intensity vs. frequency or chance of occurring. A characteristic curve plotted with quadrates shows a characteristic of output intensity vs. bias conditions in this embodiment, and that plotted with triangles shows a characteristic of output intensity vs. bias conditions in the related art. A characteristic curve of output intensity vs. frequency or chance of occurring is shown in a curve plotted with squares. FIG. 10B shows a characteristic of output intensity vs. current consumption comparing to that of the related art, and a characteristic of output intensity vs. product of the current consumption and the frequency. A characteristic curve plotted with quadrates shows a characteristic of output intensity vs. product of current and frequency in this embodiment, and that plotted with triangles shows a characteristic of output intensity vs. product of current and frequency in the related art. A characteristic curve plotted with squares shows a characteristic of output intensity vs. current consumption in this embodiment, and that plotted with 'x's shows a characteristic of output intensity vs. current consumption in the related art. In the coordinate system of FIG. 10A, a scale on the horizontal axis indicates the transmitting power Pout of the mobile unit using a ratio to the transmitting power value when the mobile unit is very remote from the cell-site station, a scale for frequency on the vertical axis indicates the characteristic of frequency using a ratio to the frequency value when the mobile unit is near the cell-site station, or the Pout is nearly −70 dB, and a scale for Vdd on the vertical axis indicates the bias conditions using a ratio to the bias voltage value when the mobile unit is very remote from the cell-site station, or the Pout is nearly 0 dB. In the coordinate system of FIG. 10B, a scale on the horizontal axis indicates the transmitting power Pout of the mobile unit using a ratio to the transmitting power value when the mobile unit is very remote from the cell-site station, a scale for Idd on the vertical axis indicates the characteristic of current using a ratio to the current value when the mobile unit is very remote from the cell-site station, or the Pout is nearly 0 dB, and a scale for product of Idd and frequency on the vertical axis indicates the actual current consumption using a ratio to the maximum current consumption value of the related art.

In a system applying IS-95, the cell-site stations are located in such a manner that their service areas overlap to some extent in order to prevent occurrence of vacant areas where the service is not available. As a result, frequency or chances of being very remote from the cell-site station (the transmitting power Pout of the mobile unit increases in this condition) is small as shown in FIG. 10A. This means that the current at medium to low output power contributes more to the current consumption of the mobile unit than that at high or maximum output power. In this embodiment, the bias condition Vdd is controlled as shown in the curve plotted with quadrates by using a function stored in MEM 330. In this embodiment, the function controls the bias condition Vdd to vary in 9 steps. When the mobile unit is near the cell-site, or the Pout is nearly up to −50 dB, the bias condition Vdd(b) is nearly 60% of the maximum value. As the mobile unit moving away from the cell-site, Vdd(b) increases gradually, and when the mobile unit gets very far from the cell-site, Vdd(b) becomes the maximum value. While in the related art, Vdd(a) is kept constant at nearly 70% of the maximum value up to the point where Pout is nearly −30 DB. Then Vdd(a) increases abruptly to the maximum value and kept constant up to the point where Pout is 0 dB. The characteristics of current corresponding to Vdd(a) and Vdd(b) are indicated in FIG. 10B as Idd(a) and Idd(b), respectively. These current values are calculated using measured values obtained from power amplifier module for CDMA system in Japan. Since the current capacity is as high as some 100 mA–1000 mA, converting efficiency must be considered in calculating the currents. In this embodiment, the efficiency is estimated to be approximately 90%. Actual current consumption is calculated by making a product of Idd and frequency. As shown in FIG. 10B, current consumption in this embodiment is lower than that in the related art within the region where Pout is less than −20 dB. Nearly 14% reduction in current consumption is available in comparison to the related art.

Figure 5:
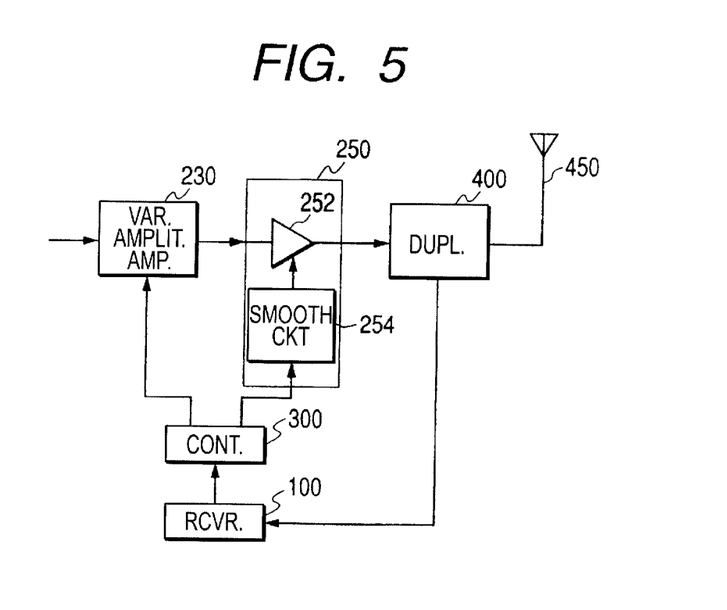
FIG. 5 shows a block diagram of a main part of the cellular telephone in the second embodiment of the present invention.
Figure 6A:
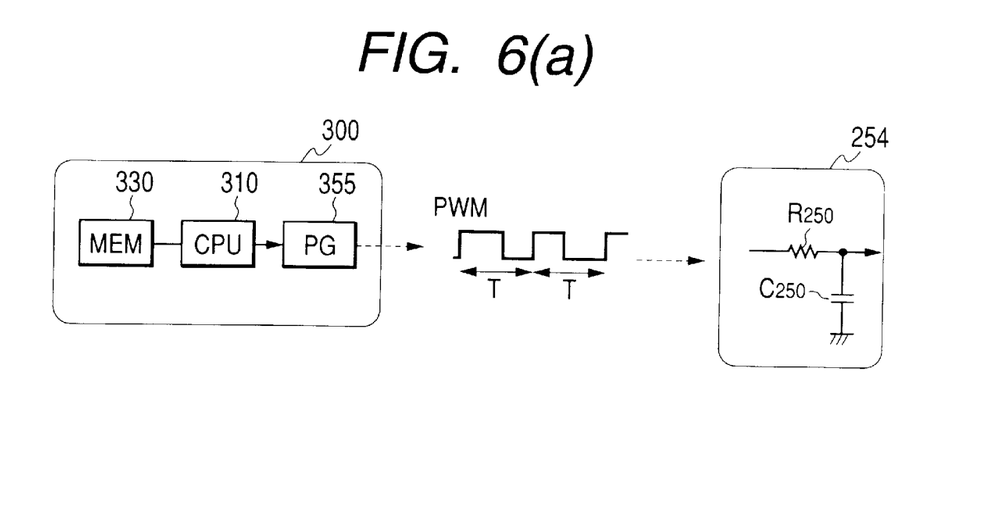
FIG. 6A shows a case where the CPU controls the PG in PWM mode.

The second embodiment of the present invention is explained referring to FIGS. 5 and 6. In this embodiment, pulse signals are used as a bias controlling signal for controlling the bias of the power amplifier means 250. As disclosed in FIG. 6A, the controller 300 includes a pulse generator (PG) 355 instead of the D/A 350. In this embodiment, the PG 355 generates a pulse train with pulse repetition of T. The pulse train is modulated employing a pulse width modulation (PWM) and is supplied to the power amplifier means 250. Generally, when a high resolution is required for controlling the bias signal, the D/A 350, which can perform a high resolution converting, will cost very much expensive. Since the PG 355 is available at lower cost than the D/A 350 of high resolution type, high resolution bias control is available at low cost in this embodiment. In addition, PG 355 is suitable for providing the bias voltage, when the bias condition is calculated by the function stored in the MEM 330. The CPU 310 controls the PG 355 so as to control the pulse width according to the calculated result by the function. The power amplifier means 250 includes a smoothing circuit 254 and an amplifier 252, as disclosed in FIG. 5. The smoothing circuit 254 comprises a resistor R250 and a capacitor C250 as disclosed in FIG. 6A. The pulse signal supplied from the control circuit 300 is converted into a bias voltage within the power amplifier means 250. Since the smoothing circuit 254 is provided within the power amplifier means 250, erroneous effects caused by external noise are reduced. In this embodiment the same components as that of the first embodiment except the controller 300 and the power amplifier means 250.

Figure 6B:
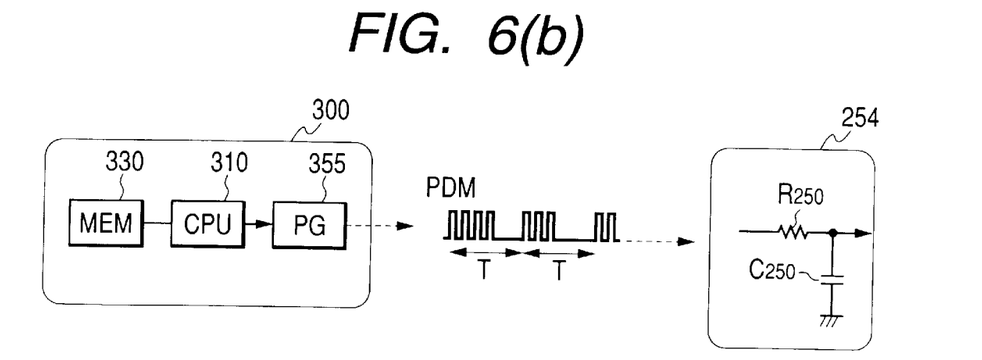
FIG. 6B shows a case where the CPU controls the PG in PDM mode.

A variation for the second embodiment is explained referring to FIG. 6B. In this variation, the pulse train is modulated employing a pulse density modulation (PDM). The CPU 310 controls the PG 355 so as to control the pulse density according to the calculated result by the function. The pulse signal supplied from the control circuit 300 is converted into a bias voltage within the power amplifier means 250. This variation can also reduce erroneous effects caused by external noise.

Figure 7:
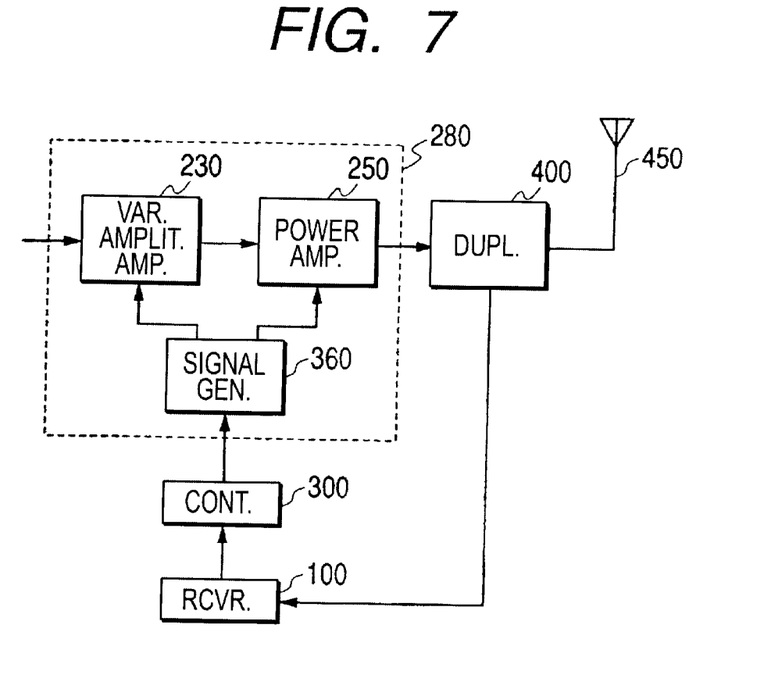
FIG. 7 shows a block diagram of a main part of the cellular telephone in the third embodiment of the present invention.

The third embodiment of the present invention is described referring to FIG. 7. In this embodiment, the variable amplitude amplifier 230, the power amplifier means 250 and a signal generator 360 are integrated together in a amplifier 280. The amplifier 280 is in the shape of an integrated circuit (IC), or in the shape of a printed circuit board. The signal generator 360 is connected to the controller 300. The signal generator 360 receives a controlling signal from the controller 300 and generates the gain control signal for the variable amplitude amplifier 230 and the bias control signal for the power amplifier means 250. The gain control signal is supplied to the variable amplitude amplifier 230 within the amplifier 280. The bias control signal is supplied to the power amplifier means 250 also within the amplifier 280. Thus, the wiring among the controller 300, the variable amplitude amplifier 230 and the power amplifier means 250 are reduced and simplified. In this embodiment, the controller can control both the power amplifier means 250 and the variable amplitude amplifier 230 by just supplying the controlling signal to the signal generator 360, which reduces steps in processes of the controller 300.

Figure 8:
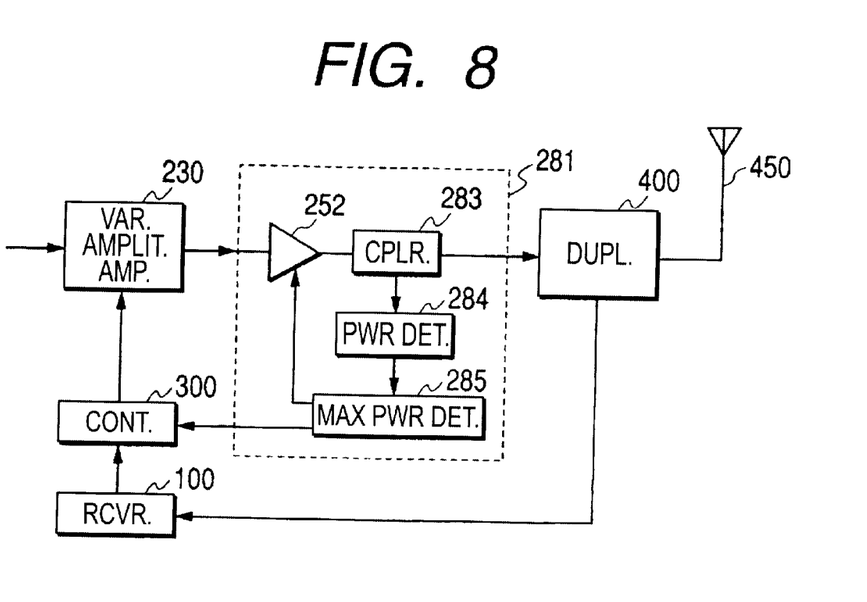
FIG. 8 shows a block diagram of a main part of the cellular telephone in the second embodiment of the present invention.

The fourth embodiment of the present embodiment is explained referring to FIG. 8. In this embodiment, an amplifier 281 having a function of detecting the maximum power is employed, and the controller 300 supplies its output only to the variable amplitude amplifier 230 and receives a feedback signal from the amplifier 281. In IS-95 standard, the transmitting power is controlled by a transmitting power controlling signal sent from the cell-site station for performing the closed-loop power control. According to the IS-95 standard, since the cell-site station detects the transmitting power of the mobile unit, power detection in the mobile unit is basically unnecessary. However, the transmitting power controlling signal sometimes exceeds the maximum power determined to guarantee the quality of the communication by preventing inconvenient condition such as distortion etc. at the mobile unit. In order to guarantee the quality of the communication, it is necessary to detect the transmitting power for controlling or limiting the transmitting power. The amplifier 281 comprises a power amplifier 252, a coupler 283, a power detector 284 and a maximum power detector 285. The amplifier 252 and the coupler 283 is connected in series. The output of the variable amplitude amplifier 230 is supplied to the input port of the power amplifier 252. An output of the power amplifier 252 is supplied to the duplexer 400 through the coupler 283. The power detector 284 is connected to the coupler 283 and detects the output power of the power amplifier 252. An output of the power detector is supplied to the maximum power detector 285, and the maximum power detector 285 outputs the feedback signal to the controller 300 and feeds back the output to the amplifier 252 for controlling its output power. Above embodiment can reduce the quantity of the parts, even though power detection is performed.

Figure 9:
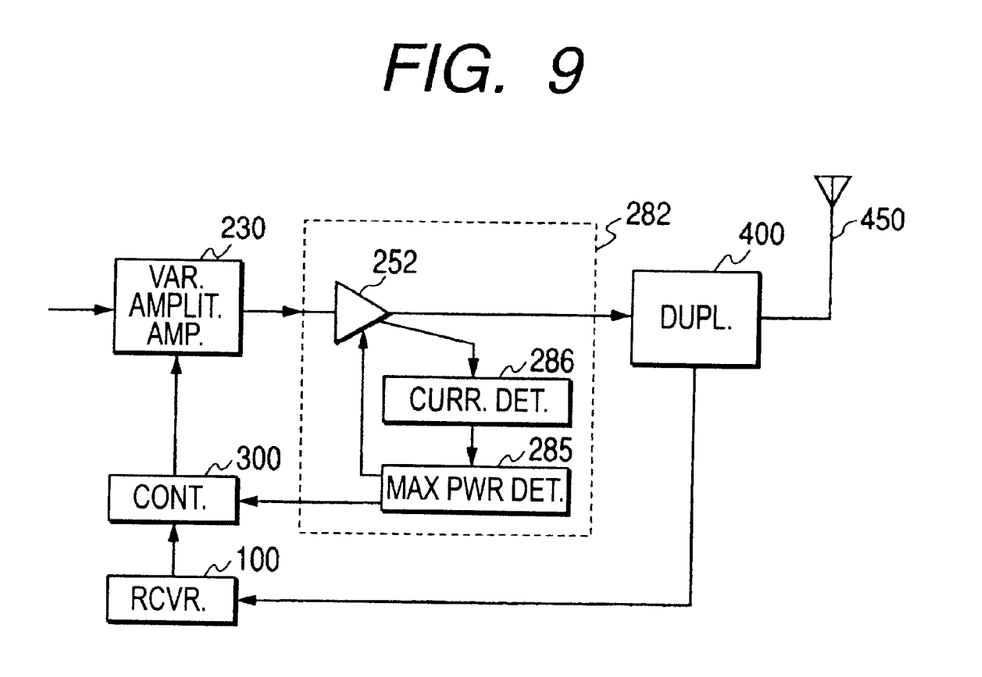
FIG. 9 shows a block diagram of a main part of the cellular telephone in the third embodiment of the present invention.

The fifth embodiment of the present embodiment is explained referring to FIG. 9. In this embodiment, an amplifier 282 has a function of detecting current in order to detect the maximum power. Since the output power of the amplifier 282 and the current consumption thereof have a correlation, the maximum power can be detected from the current value. This embodiment employs the amplifier 282 having a current detector instead of the amplifier 281 in the fourth embodiment, and the controller 300 supplies its output only to the variable amplitude amplifier 230 and receives a feedback signal from the amplifier 282. The amplifier 282 comprises a power amplifier 252, a current detector 284 and a maximum power detecting means 285. The output of the variable amplitude amplifier 230 is supplied to the input port of the power amplifier 252. An output of the power amplifier 252 is supplied to the duplexer 400. The current detector 286 is connected to the power amplifier 252 and detects the current of the power amplifier 252. An output of the current detector 286 is supplied to the maximum power detector 285, and the maximum power detector 285 outputs the feedback signal to the controller 300 and feeds back the output to the power amplifier 252 for controlling its output power. Above embodiment can reduce the quantity of the parts, even though power detection is performed. Since the coupler 203 is not employed, loss between the power amplifier 252 and the duplexer 400 can be reduced, which enables to reduce a current consumption in the amplifier 282. Further, by setting another threshold value, which indicates abnormal condition of the power amplifier 252, and by providing the maximum power detecting means 285 with a function which can output an alarm signal to the controller 300 and control the power amplifier 252 to stop, failure detection and protection of the amplifier 282 is available.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A cellular telephone adapted to be used in a CDMA system, comprising:

an antenna for receiving a first communication signal and a transmitting power control signal from a cell-site station and transmitting a second communication signal to the cell-site station, a duplexer connected to said antenna, a receiver connected to said antenna through said duplexer for converting said first communication signal into a voice signal code, and for outputting a power control signal derived from said transmitting power control signal sent from said cell-site station, an encoder/decoder apparatus connected to said receiver and an acoustic transducer for converting said voice signal code into an audio signal for driving said acoustic transducer and converting an audio input signal from said acoustic transducer into an input voice code signal, a transmitter connected to said encoder/decoder apparatus and to said antenna through said duplexer for converting said input voice code signal into said second communication signal, and a controller connected to said receiver and said transmitter for controlling an amplitude of said transmitter, wherein said transmitter includes a variable amplitude amplifier and a power amplifier, said controller includes a central processing unit and a memory, said controller controls said transmitter so that an open-loop power control is performed and then a closed-loop power control is performed according to said power control signal so as to control the transmitted power to converge into a range required by said cell-site station, and said controller controls a gain of said variable amplitude amplifier and a bias condition of said power amplifier using a set of bias and gain data stored in said memory.

2. A cellular telephone according to claim 1, wherein said controller further includes a pulse generator, said pulse generator is connected to said power amplifier so as to supply a pulse as a bias control signal, and said controller controls a pulse width of said pulse so as to control said bias condition.

3. A cellular telephone according to claim 2, wherein said power amplifier further includes a smoothing circuit for smoothing said pulse.

4. A cellular telephone according to claim 1, wherein said controller further includes a pulse generator, said pulse generator is connected to said power amplifier so as to supply pulses as a bias control signal, and said controller controls a pulse density of said pulses so as to control said bias condition.

5. A cellular telephone according to claim 4 wherein said power amplifier further includes a smoothing circuit for smoothing said pulses.

6. A cellular telephone according to claim 1, wherein said transmitter further includes a signal generator connected to said controller, said signal generator is connected to said variable amplitude amplifier and said power amplifier so as to supply a gain control signal and a bias control signal to said variable amplitude amplifier and said power amplifier respectively.

7. A cellular telephone adapted to be used in a CDMA system, comprising:

an antenna for receiving a first communication signal and a transmitting power control signal from a cell-site station and transmitting a second communication signal to the cell-site station, a duplexer connected to said antenna, a receiver connected to said antenna through said duplexer for converting said first communication signal into a voice signal code, and for outputting a power control signal derived from said transmitting power control signal sent from said cell-site station, an encoder/decoder apparatus connected to said receiver and an acoustic transducer for converting said voice signal code into an audio signal for driving said acoustic transducer and converting an audio input signal from said acoustic transducer into an input voice code signal, a transmitter connected to said encoder/decoder apparatus and to said antenna through said duplexer for converting said input voice code signal into said second communication signal, and a controller connected to said receiver and said transmitter for controlling an amplitude of said transmitter, wherein said transmitter includes a variable amplitude amplifier and a power amplifier, said power amplifier includes a maximum power detector, said controller includes a central processing unit and a memory, said controller controls said transmitter so that an open-loop power control is performed and then a closed-loop power control is performed according to said power control signal so as to control the transmitted power to converge into a range required by said cell-site station, said controller controls a gain of said variable amplitude amplifier using a function defining a relation between bias data and gain data stored in said memory, and said maximum power detector controls and output power of said power amplifier.

\* \* \* \* \*

UNITED STATES PATENT AND TRADEMARK OFFICE
CERTIFICATE OF CORRECTION

PATENT NO. : 6,408,193 B1
DATED : June 18, 2002
INVENTOR(S) : M. Katagishi et al.

It is certified that error appears in the above-identified patent and that said Letters Patent is hereby corrected as shown below:

<u>Column 12,</u>
Line 46, "and output" should read -- an output . --

Signed and Sealed this

Nineteenth Day of November, 2002

*Attest:*

JAMES E. ROGAN
*Attesting Officer*  *Director of the United States Patent and Trademark Office*